(12) United States Patent
Kim et al.

(10) Patent No.: US 7,298,875 B2
(45) Date of Patent: Nov. 20, 2007

(54) CAPACITANCE-TYPE FINGERPRINT SENSOR

(75) Inventors: Seong-Jin Kim, Seoul (KR); Euisik Yoon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 576 days.

(21) Appl. No.: 11/018,372

(22) Filed: Dec. 22, 2004

(65) Prior Publication Data

US 2005/0174128 A1   Aug. 11, 2005

(30) Foreign Application Priority Data

Feb. 10, 2004   (KR) ...................... 10-2004-0008710

(51) Int. Cl.
*G06K 9/00* (2006.01)

(52) U.S. Cl. ...................................... 382/124

(58) Field of Classification Search ........ 382/115–118, 382/124–127
See application file for complete search history.

(56) References Cited

U.S. PATENT DOCUMENTS

| | | | |
|---|---|---|---|
| 4,353,056 A | | 10/1982 | Tsikos |
| 6,097,195 A | * | 8/2000 | Ackland et al. ............ 324/719 |
| 6,438,257 B1 | * | 8/2002 | Morimura et al. .......... 382/124 |
| 6,759,889 B2 | * | 7/2004 | Bird ............................ 327/407 |
| 7,141,839 B2 | * | 11/2006 | Thomas et al. ............. 257/252 |
| 2004/0129787 A1 | * | 7/2004 | Saito et al. ................. 235/492 |
| 2004/0217781 A1 | * | 11/2004 | Bird ............................ 327/91 |

OTHER PUBLICATIONS

Jung et al., "A Low-Power and High-Performance CMOS Fingerprint Sensing and Encoding Architecture," IEEE Journal of Solid-State Circuits, vol. 34, No. 7, Jul. 1999.
Lee et al., "A 500dpi Capacitive-Type CMOS Fingerprint Sensor with Pixel-Level Adaptive Image Enhancement Scheme," ISSCC 2002, Session 21, TD: Sensors and Microsystems, IEEE International Solid-State Circuits Conference, 2002.

* cited by examiner

*Primary Examiner*—Vikkram Bali
(74) *Attorney, Agent, or Firm*—Oliff & Berridge, PLC

(57) ABSTRACT

A capacitance-type fingerprint sensor. The capacitance-type fingerprint sensor includes a plurality of pixel groups, each of which electrically connects a plurality of sensing electrodes to a plurality of coupling electrodes, respectively; a plurality of first sensing-electrode switches for connecting the sensing electrodes to a voltage source; a plurality of second sensing-electrode switches for interconnecting the sensing electrodes contained in the pixel groups; a plurality of third sensing-electrode switches for interconnecting the pixel groups; and a plurality of coupling-electrode switches for interconnecting the coupling electrodes contained in all pixel groups. Therefore, the fingerprint sensor blocks or corrects capacitance generated by internal components of a fingerprint sensor, such that it acquires a high-quality fingerprint image. Also, the fingerprint sensor corrects or reduces the influence of the dry or moist state of a finger surface, such that a fingerprint image can be more uniformly indicated.

4 Claims, 4 Drawing Sheets

CAPACITANCE-TYPE FINGERPRINT SENSOR

BACKGROUND OF THE INVENTION

1. Field of the Invention

The present invention relates to a capacitance-type fingerprint sensor, and more particularly to a capacitance-type fingerprint sensor using a two-stage electrode.

2. Description of the Related Art

A fingerprint recognition system acquires a fingerprint image, and compares the acquired fingerprint image with a pre-stored fingerprint image using unique characteristics of people's fingerprints such that it can recognize a specific person from among a plurality of persons. The fingerprint system has been widely used for security and authentication systems, and includes a fingerprint sensor for acquiring a fingerprint image and an image processor for comparing the acquired fingerprint image with a pre-stored fingerprint image. Typically, the fingerprint sensor includes an image sensor and additional devices (e.g., a light source, and a lens, etc.) for generating an optical fingerprint image. There have recently been researched semiconductor-type sensors capable of acquiring a fingerprint using only a single chip without using additional devices required for a conventional optical system, such that they have been widely applied to mobile devices such as a mobile phone and a smart card, etc.

Particularly, the capacitance-type fingerprint sensor from among the above-mentioned semiconductor-type sensors is adapted to recognize a fingerprint using a difference in capacitor's capacitance generated when the fingerprint contacts a sensing electrode, and has an advantage in that it can be implemented with a conventional Complementary Metal Oxide Semiconductor (CMOS) circuit fabrication without using additional processes, such that it is most widely used to recognize a fingerprint.

A basic capacitance-type fingerprint sensor structure has been described in U.S. Pat. No. 4,353,056 filed by Siemens Corporation in Germany, entitled "CAPACITIVE FINGERPRINT SENSOR". A structure for enhancing an output fingerprint image quality of a fingerprint sensor and detecting characteristics of the output fingerprint image has been described in IEEE Journal of Solid-State Circuits, 1999, vol. 34, no. 7, pp. 978~984, proposed by S. Jung. A method for removing a parasitic component from a capacitance-type fingerprint sensor and enhancing a fingerprint image quality of the fingerprint sensor has been described in IEEE International Solid-State Circuit Conference on 2002, proposed by K. Lee.

FIGS. 1a~1c are schematic diagrams illustrating a sensing unit of a conventional capacitance-type fingerprint sensing apparatus.

Referring to FIG. 1a, the conventional capacitance-type fingerprint sensing apparatus detects capacitor's capacitance formed between a finger skin surface and each uppermost metal plate 10 used as a sensing electrode, such that it acquires a fingerprint image. The metal plate 10 acting as a sensing electrode has a two-dimensional layout, and each pixel positioned at a lower part of the metal plate 10 includes a detection circuit 20 for detecting capacitor's capacitance. An output terminal of the detection circuit 20 contained in each pixel is connected to a column-direction selection drive 22 by a row-direction selection drive 21, and output signals of pixels arranged by the column-direction selection drive 22 are sequentially generated.

Referring to FIG. 1b, the detection circuit 20 connected to the metal plate 10 acting as a sensing electrode is formed in an insulating layer 40 formed on a substrate 30, such that it is insulated from an external part. However, not only capacitance formed between a finger and a sensing electrode to form a fingerprint image, but also parasitic capacitance is formed among the sensing electrode, the substrate and the detection circuit, such that the parasitic capacitance acts as a fixed signal irrespective of the fingerprint image.

FIG. 1c is a schematic diagram illustrating how a fingerprint image is differently represented according to the degree of moisture left on a finger surface in the case of using the fingerprint sensing apparatus shown in FIGS. 1a~1b.

Referring to FIG. 1c, if the finger surface is not in an especially dry or moist state, the skin of the finger acts as an electrode, such that a fingerprint image matched with a real fingerprint is formed. Otherwise, if the finger surface is moist, moisture left on the finger surface acts as an electrode. Also, if the finger surface is dry, the dermis of the finger acts as an electrode, such that a fingerprint image different from a real fingerprint is formed.

As mentioned above, capacitor's capacitance formed when the sensing electrode contacts the finger surface has difficulty in acquiring a high-quality fingerprint image due to parasitic capacitance formed in a circuit capable of detecting the dry or moist state of a finger surface or the capacitor's capacitance, such that it causes the conventional fingerprint recognition system to be erroneously operated.

SUMMARY OF THE INVENTION

Therefore, the present invention has been made in view of the above problems, and it is an object of the present invention to provide a capacitance-type fingerprint sensor for reducing the influence of parasitic capacitance and the influence of a dry or moist state of a finger, such that it acquires a high-quality fingerprint image.

In accordance with the present invention, the above and other objects can be accomplished by a capacitance-type fingerprint sensor apparatus comprising: a substrate; a plurality of pixel groups, each of which includes a plurality of pixels arranged in the form of an array; and a plurality of switches.

Preferably, each of the pixels includes: a coupling electrode which is surrounded by an insulating layer, and is positioned on the substrate; a sensing electrode which is surrounded by an insulating layer, and is positioned on the coupling electrode to correspond to the coupling electrode; and a detection circuit for detecting variable capacitance between the sensing electrode and a user's finger when the user's finger is brought into contact with the insulating layer surrounding the sensing electrode.

Preferably, each of the pixels includes a plurality of pixels, individual sensing electrodes contained in one pixel group are electrically connected to each other and are connected to a first external voltage source, and individual coupling electrodes contained in one pixel group are electrically connected to each other and are connected to a second external voltage source.

Preferably, the switches include: a plurality of first sensing-electrode switches for connecting individual sensing electrodes contained in each pixel group to the first external voltage source, respectively; a plurality of second sensing-electrode switches for interconnecting all sensing electrodes contained in each pixel group; a plurality of third sensing-electrode switches for connecting selected sensing electrodes contained in one pixel group to other selected sensing electrodes contained in the other pixel group, respectively, such that the sensing electrodes contained in all pixel groups are electrically connected to each other; and a plurality of coupling-electrode switches for electrically interconnecting the coupling electrodes contained in all pixel groups.

The capacitance-type fingerprint sensor apparatus includes a first step, in which the first sensing-electrode switches, the second sensing-electrode switches, the third sensing-electrode switches, and the coupling-electrode switches are turned on, and a voltage $V_1$ is applied to the first and second voltage sources; a second step, in which the third sensing-electrode switches are turned off not to interconnect the pixel groups, the first sensing-electrode switches are turned off to block the first voltage source, and a voltage $V_2$ is applied to the second voltage source, such that a mean capacitance value for each pixel group is calculated in association with each of the pixel groups; and a third step, in which the second sensing-electrode switches are turned off to prevent the pixels contained in each pixel group from being electrically interconnected, and a voltage of $V_1$ is applied to the second voltage source, such that changed capacitance for each sensing electrode is calculated, wherein a voltage corresponding to a difference between the mean capacitance value for each pixel group at the second step and the capacitance calculated at the third step is detected, such that distortion of a fingerprint image formed by a dry or moist state of a finger brought into contact with the insulating layer surrounding the sensing electrodes can be corrected.

Preferably, the voltages $V_1$ and $V_2$, the mean capacitance value $C_{favg}$ for each pixel group, capacitance $C_{fi}$ for each sensing electrode, capacitance C formed between the coupling electrode and the sensing electrode, and a voltage $V_o'$ for each sensing electrode at the third step are represented by the following equation:

$$V_o' = V_1 - \Delta V \left( \frac{C}{C + C_{favg}} - \frac{C}{C + C_{fi}} \right)$$

Preferably, the capacitance-type fingerprint sensor apparatus further includes: a comparator for comparing a predetermined reference voltage $V_R$ with the voltage $V_o'$ for each sensing electrode, generating a first signal when the voltage $V_o'$ for each sensing electrode is higher than the reference voltage $V_R$, and generating a second signal when the voltage $V_o'$ for each sensing electrode is less than the reference voltage $V_R$, such that a gray level value corresponding to the reference voltage $V_R$ at an output time of the first signal generated when the voltage $V_o'$ for each sensing electrode is higher than the reference voltage $V_R$ acts as a fingerprint image.

Preferably, the reference voltage $V_R$ is gradually changed on the basis of a voltage $V_R'$ corresponding to a reference line, such that it is less or higher than the reference line voltage $V_R'$.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1A:
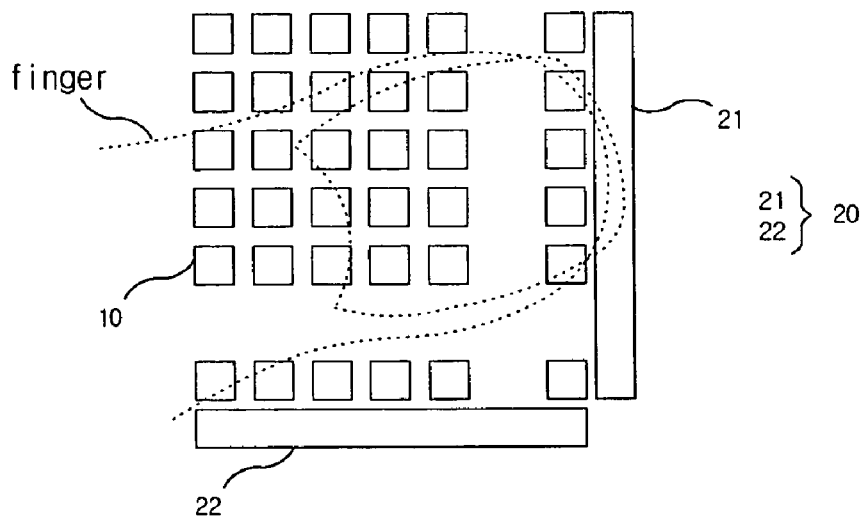
FIGS. 1a~1c are schematic diagrams illustrating a sensing unit of a conventional capacitance-type fingerprint sensing apparatus.
Figure 1B:
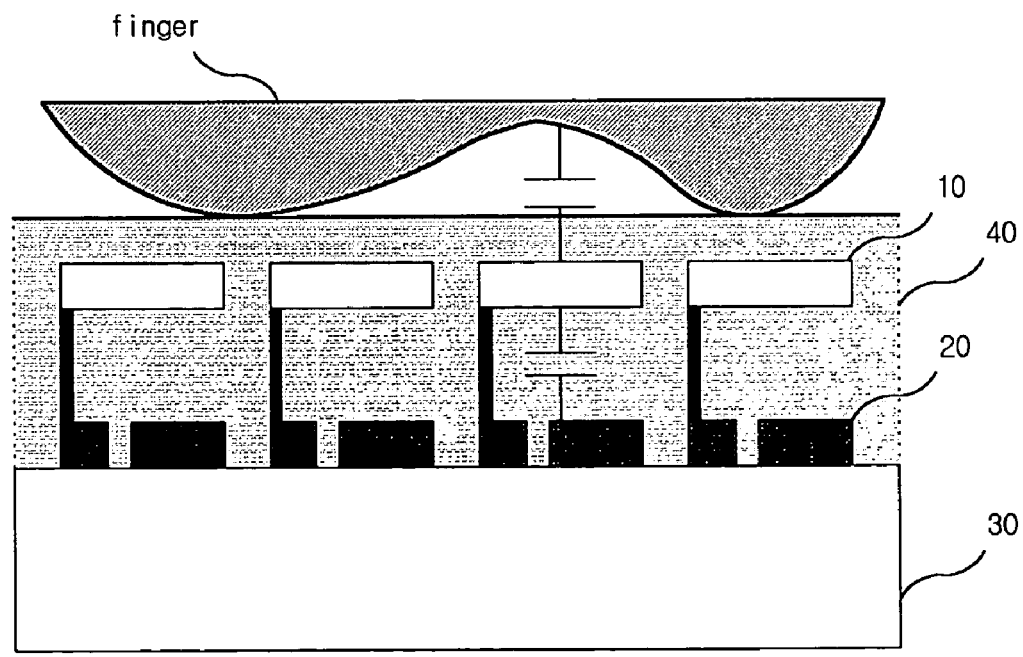
Figure 1C:
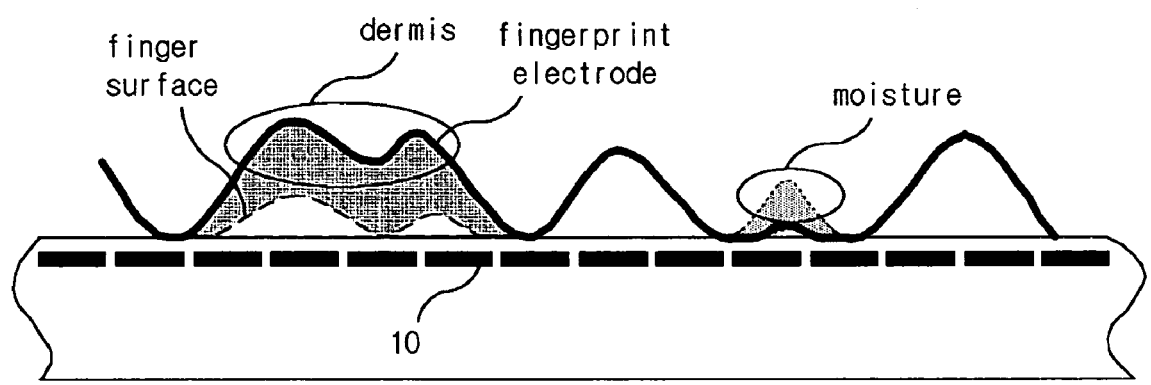

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 2:
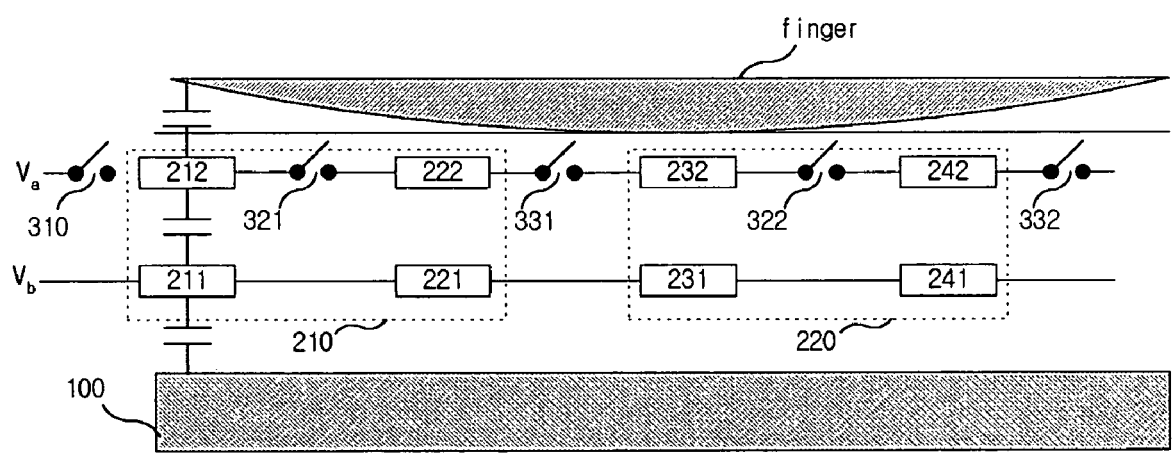
FIGS. 2~3 are schematic diagrams illustrating a capacitance-type fingerprint sensor according to the present invention.
Figure 3:
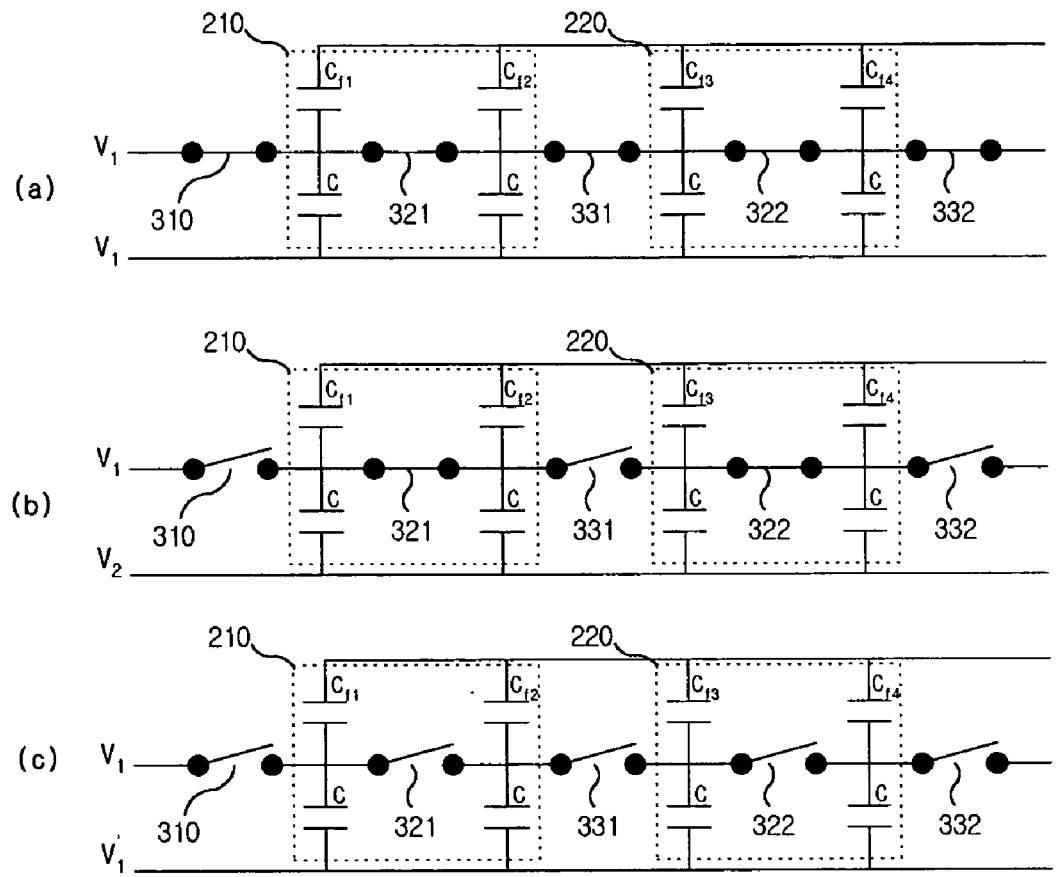

FIGS. 2~3 are schematic diagrams illustrating a capacitance-type fingerprint sensor according to the present invention.

Referring to FIG. 2, the capacitance-type fingerprint sensor according to the present invention includes a substrate 100, a plurality of pixel groups 210 and 220 each comprised of a plurality of pixels arranged in the form of an array on the substrate 100, and a plurality of switches 310, 321, 322, 331, and 332.

The pixels are formed on the substrate 100. Each pixel is surrounded by an insulating layer (not shown) to generate capacitance, and includes a plurality of coupling electrodes 211, 221, 231, and 241, a plurality of sensing electrodes 212, 222, 232, and 242, and a detection circuit (not shown). The coupling electrodes 211, 221, 231, and 241 are each surrounded by the insulating layer, are positioned on the substrate 100, and are arranged in column and row directions, such that they have a two-dimensional layout. The sensing electrodes 212, 222, 232, and 242 are each surrounded by the insulating layer, and are positioned on the coupling electrodes 211, 221, 231, and 241, respectively, such that they are connected to the above-mentioned coupling electrodes 211, 221, 231, and 241 on a one to one basis. If a user's finger is brought into contact with the insulating layer surrounding the sensing electrodes 212, 222, 232, and 242, the detection circuit detects variable capacitance between the user's finger and each of the sensing electrodes 212, 222, 232, and 242.

One pixel group 210 or 220 includes a plurality of pixels. The sensing electrodes are connected to each other in the pixel group 210 or 220, and the coupling electrodes are connected to each other in the pixel group 210 or 220. Individual sensing electrodes contained in one pixel group are connected to a first voltage source installed at an external part, and individual coupling electrodes contained in one pixel group are connected to a second voltage source. The connection between the sensing electrodes or the coupling electrodes is established by a plurality of switches.

The switches are classified into a plurality of sensing-electrode switches 310, 321, 322, 331, 332, and a plurality of coupling-electrode switches (not shown). The sensing-electrode switches 310, 321, 322, 331, and 332 are classified into first sensing-electrode switches 310, second sensing-electrode switches 321 and 322, and third sensing-electrode switches 331 and 332.

The first sensing-electrode switches 310 connect the selected one from among a plurality of sensing electrodes contained in the pixel group 210 or 220 to the first voltage source positioned at the external part.

The third sensing-electrode switches 331 and 332 connect the sensing electrodes contained in the pixel groups 210 and 220 to each other. For example, the third sensing-electrode switch 331 connects one sensing electrode 222 from among a plurality of sensing electrodes contained in the first pixel group 210 to the sensing electrode 232 from among other sensing electrodes contained in the second pixel group 220. In this way, the above-mentioned third sensing-electrode switches 331 and 332 are mounted to all pixel groups.

The coupling-electrode switches (not shown) connect the coupling electrodes contained in all pixel groups to each other.

In the meantime, each selected coupling electrodes contained in each pixel group 210 or 220 is connected to the second voltage source positioned at the external part.

The capacitance-type fingerprint sensor according to the present invention generates parasitic capacitance between the substrate 100 and each of the coupling electrodes 211, 221, 231, and 241 and capacitance (hereinafter referred to as fixed capacitance) between each of the coupling electrodes 211, 221, 231, and 241 and each of the sensing electrodes 212, 222, 232, and 242 along with variable capacitance between each of the sensing electrodes 212, 222, 232, and 242 and a finger. In this case, the coupling electrodes are charged with a predetermined voltage received from an external part and are controlled by the predetermined voltage, such that the individual parasitic capacitances do not affect the sensing electrodes. The fixed capacitance is calculated when the capacitance-type fingerprint sensor according to the present invention is designed. Therefore, the fixed capacitance is corrected, and the corrected result is reflected in the measured variable capacitance, such that a high-quality signal not affected by the parasitic capacitance and the fixed capacitance can be acquired.

A method for recognizing the dry or moist state of a user's finger, correcting the finger state and the fixed capacitance, and implementing a high-quality fingerprint image, and the relationship between the fixed capacitance and the variable capacitance will hereinafter be described with reference to FIG. 3.

As shown in FIG. 3(a), the first sensing-electrode switches 310, the second sensing-electrode switches 321 and 322, the third sensing-electrode switches 331 and 332, and the coupling-electrode switches are turned on, and the voltage of $V_1$ is applied to the first and second voltage sources. Therefore, a voltage is applied to individual fixed capacitors by means of the voltage sources, such that the amount of electric charge stored in capacitors is initiated at step (a). In this case, the amount of charge stored in the fixed capacitor 'C' is indicative of '0', and the amount of charge stored in the variable capacitor '$C_f$' (i.e., capacitance generated by the contact between the sensing electrode and the user's finger) is indicative of '$C_{fi}(V_1-V_f)$'. In this case, the voltage of $V_f$ is indicative of a voltage generated on the finger surface, and is constant during the operation time of the detection circuit.

As shown in FIG. 3(b), the third sensing-electrode switches 331 and 332 are turned off to prevent pixel groups from being interconnected, and the first sensing-electrode switches 310 are turned off to block the first voltage source. The voltage of $V_2$ is applied to the second voltage source, such that a mean capacitance value for each pixel group is calculated at step (b).

For example, the fixed capacitance generated by any pixel group 210 or 220 comprised of 8×8 pixels is indicative of '64×C', and the variable capacitance is indicative of $\Sigma C_{fi}$. Under this condition, in the case where the first and third sensing-electrode switches 310, 331 and 332 are turned off in the same manner as in the above step (b) so as to allow the sensing electrodes 212, 222, 232, and 242 of the fixed capacitor to enter a floating state, and the voltage of the coupling electrodes 211, 221, 231, and 241 is changed to the voltage of $V_2$, charges are applied to the fixed capacitance having a charge of '0'. However, a total amount of charges contained in each pixel is constant, and the charges are re-distributed again according to a fixed capacitance value and a variable capacitance value, such that the voltage of the sensing electrodes 212, 222, 232, and 242 is changed to another. The sensing electrodes contained in each pixel group 210 or 220 have the same voltage, and this voltage can be represented by the following equation 1:

$$64C(V_1 - V_2) = \quad \text{[Equation 1]}$$

$$64C(V_1 - V_o) + \sum_{i=0}^{63} C_{fi}\{(V_1 - V_f) - (V_o - V_f)\}$$

With reference to Equation 1, $C_{fi}$ is indicative of capacitance formed between each of the sensing electrodes 212, 222, 232, and 242 and the finger surface.

In this case, if the above equation 1 is calculated in association with the voltage of $V_o$ in the case of $V_1-V_2=\Delta V$ and $$\frac{1}{64}\sum_{i=0}^{63} C_{fi} = C_{favg},$$

the following equation 2 can be acquired:

$$V_o = V_1 - \Delta V\left(\frac{C}{C + C_{favg}}\right) \quad \text{[Equation 2]}$$

With reference to Equation 2, $C_{favg}$ is indicative of a mean capacitance for each pixel group 210 or 220.

As shown in FIG. 3(c), the second sensing-electrode switches 321 and 322 are turned off to prevent individual pixels contained in each pixel group from being interconnected. If the voltage of $V_1$ is applied to the second voltage source, the voltage of the sensing electrodes contained in each pixel group 210 or 220 is changed to another due to capacitance of a pixel's variable capacitor in the same manner as in the above step (b) at step (c). Provided that the voltage of the sensing electrodes contained in one pixel group is indicative of $V_o{'}$, the following equation 3 can be acquired:

$$V_o' = V_1 - \Delta V\left(\frac{C}{C + C_{favg}} - \frac{C}{C + C_{fi}}\right) \quad \text{[Equation 3]}$$

With reference to Equation 3, the voltage $V_o{'}$ of each sensing electrode is dependent on a mean capacitance value $C_{favg}$ of a variable capacitor formed between a finger surface covering a predetermined area and each of the sensing electrodes contained in one pixel group, and is also dependent on capacitance $C_{fi}$ of a variable capacitor formed between the finger surface and each sensing electrode contained in each pixel. Therefore, the shape of a fingerprint may be differently formed according to individual areas due to a difference in the dry or moist state of a finger surface, such that the influence of the finger surface state is reduced by considering a mean capacitance value of a variable capacitor arranged in the vicinity of each pixel. Also, the voltage of $V_o'$ is indicative of a function of the fixed capacitance C, the fixed capacitance C is corrected, and the corrected result is applied to the measured variable capacitance $C_{fi}$, such that a high-quality signal not affected by parasitic capacitance can be acquired.

Figure 4:
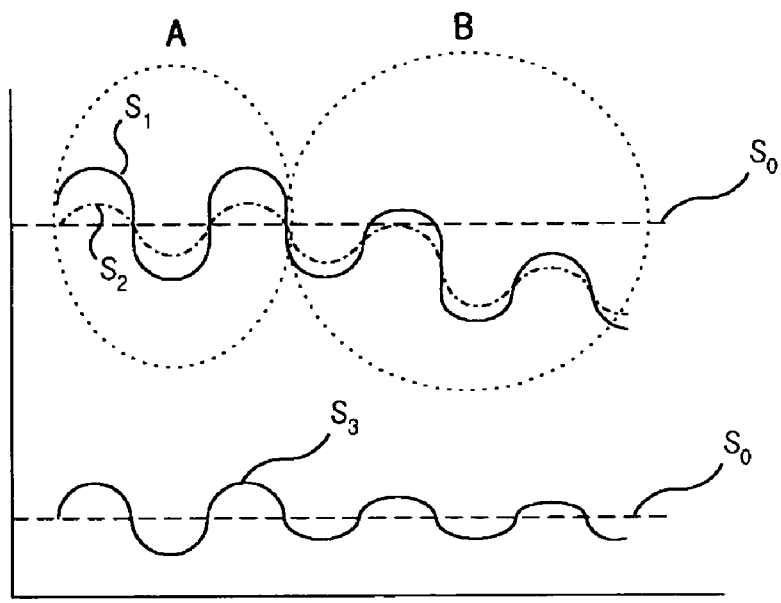
FIGS. 4~5 are graphs illustrating a method for enhancing a fingerprint image quality using the capacitance-type fingerprint sensor shown in FIGS. 2~3 according to the present invention.

FIG. 4 is a conceptual diagram illustrating a method for generating mean capacitance of a variable capacitor for each pixel group acquired by the method of FIG. 3 such that a fingerprint image quality is improved.

Referring to FIG. 4, a first signal $S_1$, which is acquired when pixel's variable capacitance formed by grooves and ridges of a finger surface is differently distributed according to individual areas due to a difference in partial state of the finger surface, and a second signal $S_2$, which is formed by a mean capacitance value of a variable capacitor contained in each pixel group, are generated, and a third signal S3 generated by a difference between two signals $S_1$ and $S_2$ is generated. In the case of substituting the first to third signals $S_1 \sim S_3$ into a reference line $S_0$, a fingerprint image quality is increased, such that grooves and ridges of the finger can be distinguished from each other.

In more detail, as shown in the upper graph of FIG. 4, a first area A in which the signal $S_1$ generated by variable capacitance of each pixel and the signal $S_2$ generated by a mean capacitance value of a variable capacitor contained in a pixel group are higher than the reference line $S_0$ is in an average state in which the finger surface is not in an especially dry or moist state, and a second area B in which the signal $S_1$ and the signal $S_2$ are less than the reference line $S_0$ is in a moist state. In the case of substituting the signal $S_3$ generated by the mean value of the signals $S_1$ and $S_2$ into the reference line $S_0$, a high-quality fingerprint image composed of grooves and ridges of a fingerprint can be acquired irrespective of the finger state. As shown in the lower graph of FIG. 4, the area positioned at the upper part of the reference line is indicative of grooves of the fingerprint, and the other area positioned at the lower part of the reference line is indicative of ridges of the fingerprint.

Figure 5:
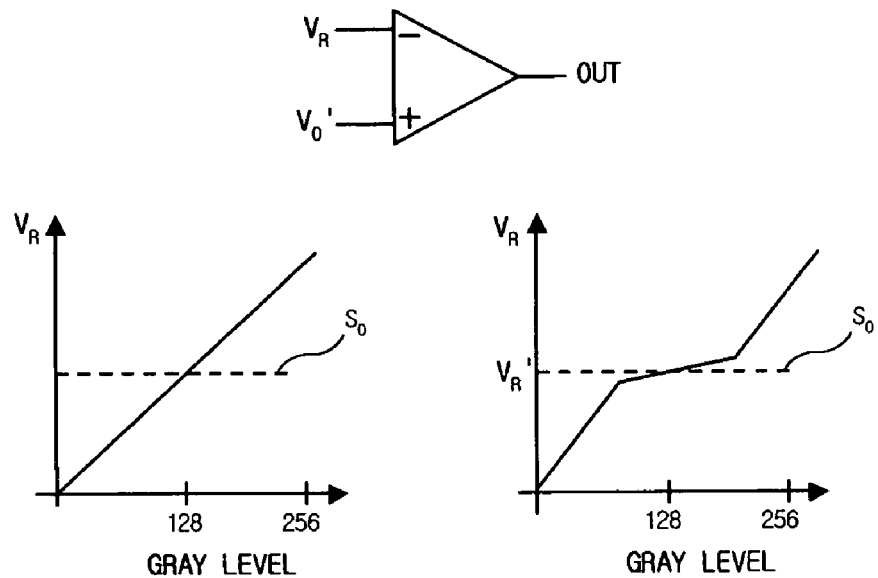

FIG. 5 is a schematic diagram illustrating a circuit for converting voltages of individual sensing electrodes into gray levels according to the present invention.

Referring to FIG. 5, a comparator compares the voltage $V_o'$ of the sensing electrode with an external reference voltage $V_R$, outputs the value of 0 when the voltage $V_o'$ of the sensing electrode is less than the reference voltage $V_R$, and outputs the value of 1 when the voltage $V_o'$ of the sensing electrode is higher than the reference voltage $V_R$. In the case of using the circuit shown in FIG. 5, a gray level value corresponding to a reference voltage when a current output value is changed to the value of 1 acts as a fingerprint image.

Referring to FIG. 5 in association with FIG. 4, the signals $S_3$ in which a mean capacitance value $C_{favg}$ of a variable capacitor contained in one pixel group and capacitance $C_{fi}$ of a variable capacitor of the sensing electrode contained in each pixel are not included, are formed in the vicinity of the reference line $S_0$. Therefore, if the reference voltage signal $V_R$ applied to the comparator is gradually changed to be less or higher than the voltage of $V_R'$ corresponding to the reference line $S_0$, the fingerprint image is more improved.

Figure 6:
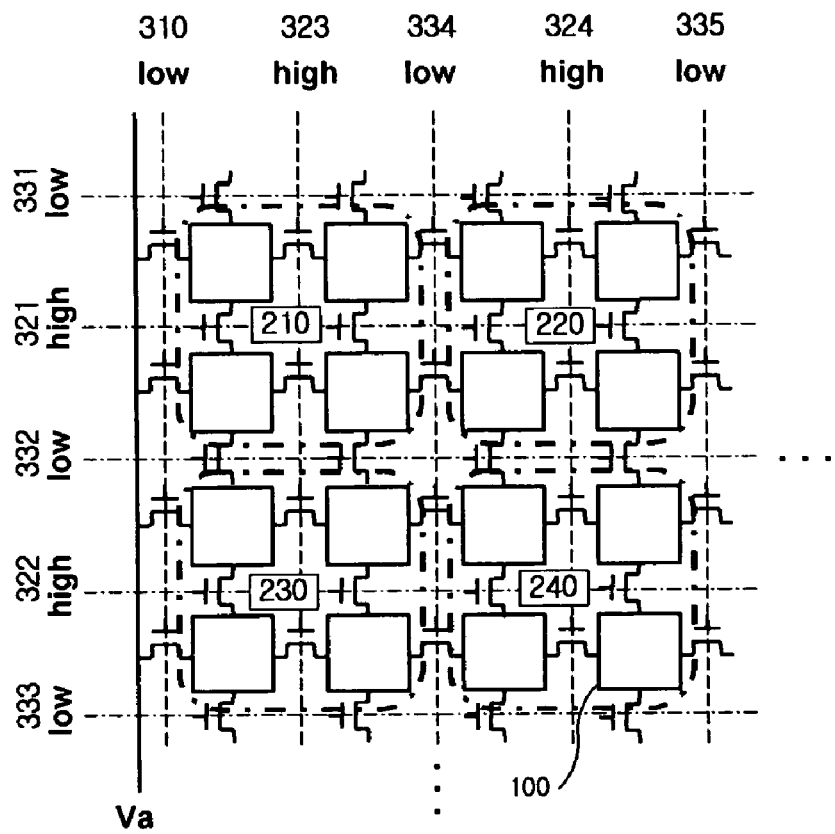
FIG. 6 is a plan view illustrating the capacitance-type fingerprint sensor shown in FIG. 2 according to the present invention.

FIG. 6 is a plan view illustrating a detection circuit of the capacitance-type fingerprint sensor shown in FIG. 2 according to the present invention. For the convenience of description, the pixel group is shown in the form of 2×2 pixels in FIG. 6.

Referring to FIG. 5 in association with FIG. 2, the first, second, and third sensing-electrode switches 310, 321, 322, 323, 324, 331, 332, 333, 334, and 335 are implemented with transistors, and on/off operations of the transistors are controlled, such that all sensing electrodes contained in each pixel group may be connected to each other or may be connected to the first voltage source $V_a$. In FIG. 6, the first to third sensing-electrode switches 310, 321, 322, 323, 324, 331, 332, 333, 334, and 335 are disconnected from the first voltage source $V_a$, and the sensing electrodes contained in each pixel group are connected to each other. In other words, FIG. 6 shows a configuration in the above step (b). In the case where individual switches 310, 321, 322, 323, 324, 331, 332, 333, 334, and 335 contained in the detection circuit shown in FIG. 6 are arbitrarily controlled, the number of connected pixels is changed to another number, such that fingerprint images having different resolutions can be detected.

As apparent from the above description, the present invention blocks or corrects capacitance generated by internal components of a conventional fingerprint sensor using a two-stage electrode, such that it removes unnecessary signals not associated with a fingerprint image, resulting in an improved fingerprint image.

Also, the present invention corrects or reduces the influence of the dry or moist state of a finger surface, such that a fingerprint image differently shown according to individual areas can be more uniformly indicated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A capacitance-type fingerprint sensor apparatus comprising:
   a substrate;
   a plurality of pixel groups, each of which includes a plurality of pixels arranged in the form of an array; and
   a plurality of switches,
   each of the pixels including:
   a coupling electrode which is surrounded by an insulating layer, and is positioned on the substrate;
   a sensing electrode which is surrounded by an insulating layer, and is positioned on the coupling electrode to correspond to the coupling electrode; and
   a detection circuit for detecting variable capacitance between the sensing electrode and a user's finger when the user's finger is brought into contact with the insulating layer surrounding the sensing electrode,
   wherein each of the pixels includes a plurality of pixels, individual sensing electrodes contained in one pixel group are electrically connected to each other and are connected to a first external voltage source, and individual coupling electrodes contained in one pixel group are electrically connected to each other and are connected to a second external voltage source, and
   the switches include:

a plurality of first sensing-electrode switches for connecting individual sensing electrodes contained in each pixel group to the first external voltage source, respectively;

a plurality of second sensing-electrode switches for interconnecting all sensing electrodes contained in each pixel group;

a plurality of third sensing-electrode switches for connecting selected sensing electrodes contained in one pixel group to other selected sensing electrodes contained in the other pixel group, respectively, such that the sensing electrodes contained in all pixel groups are electrically connected to each other; and a plurality of coupling-electrode switches for electrically interconnecting the coupling electrodes contained in all pixel groups.

2. The apparatus according to claim 1, comprising:

a first step, in which the first sensing-electrode switches, the second sensing-electrode switches, the third sensing-electrode switches, and the coupling-electrode switches are turned on, and a voltage $V_1$ is applied to the first and second voltage sources;

a second step, in which the third sensing-electrode switches are turned off not to interconnect the pixel groups, the first sensing-electrode switches are turned off to block the first voltage source, and a voltage $V_2$ is applied to the second voltage source, such that a mean capacitance value for each pixel group is calculated in association with each of the pixel groups; and a third step, in which the second sensing-electrode switches are turned off to prevent the pixels contained in each pixel group from being electrically interconnected, and a voltage of $V_1$ is applied to the second voltage source, such that changed capacitance for each sensing electrode is calculated, wherein a voltage corresponding to a difference between the mean capacitance value for each pixel group at the second step and the capacitance calculated at the third step is detected, such that distortion of a fingerprint image formed by a dry or moist state of a finger brought into contact with the insulating layer surrounding the sensing electrodes can be corrected.

3. The apparatus according to claim 2, wherein:

the voltages $V_1$ and $V_2$, the mean capacitance value $C_{favg}$ for each pixel group, capacitance $C_{fi}$ for each sensing electrode, capacitance C formed between the coupling electrode and the sensing electrode, and a voltage $V_0'$ for each sensing electrode at the third step are represented by the following equation:

$$V_o' = V_1 - \Delta V \left( \frac{C}{C + C_{favg}} - \frac{C}{C + C_{fi}} \right)$$

the apparatus further includes:

a comparator for comparing a predetermined reference voltage $V_R$ with the voltage $V_0'$ for each sensing electrode, generating a first signal when the voltage $V_0'$ for each sensing electrode is higher than the reference voltage $V_R$, and generating a second signal when the voltage $V_0'$ for each sensing electrode is less than the reference voltage $V_R$, such that a gray level value corresponding to the reference voltage $V_R$ at an output time of the first signal generated when the voltage $V_0'$ for each sensing electrode is higher than the reference voltage $V_R$ acts as a fingerprint image.

4. The apparatus according to claim 3, wherein the reference voltage $V_R$ is gradually changed on the basis of a voltage $V_R'$ corresponding to a reference line, such that it is less or higher than the reference line voltage $V_R'$.

* * * * *